(No Model.)
G. R. DUVAL.
VEHICLE BRAKE.
No. 271,047. Patented Jan. 23, 1883.
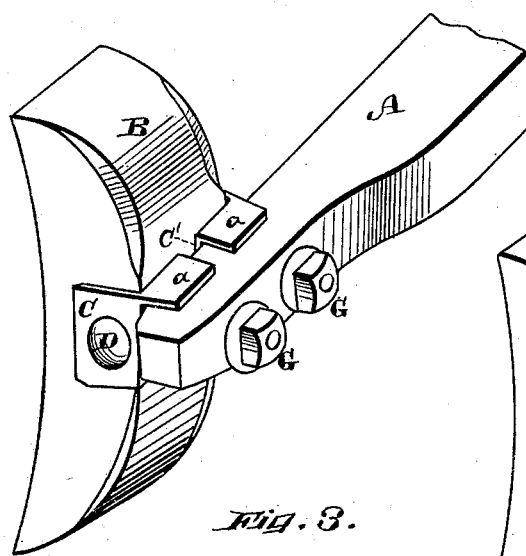
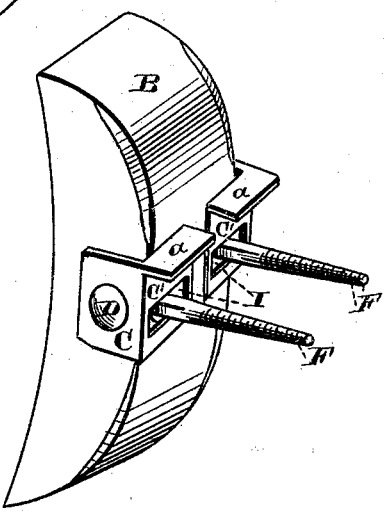
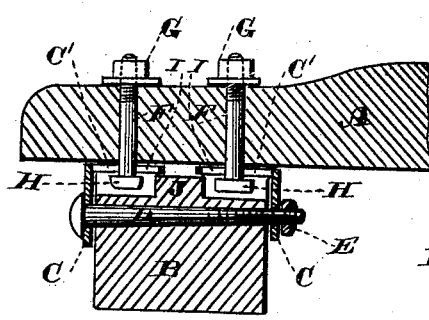
Witnesses,
Geo. H. Strong.
J. H. Rouse.
Inventor,
Geo. R. Duval
Dewey & Co.
Attorneys

UNITED STATES PATENT OFFICE.

GEORGE R. DUVAL, OF BENICIA, CALIFORNIA.

VEHICLE-BRAKE.

SPECIFICATION forming part of Letters Patent No. 271,047, dated January 23, 1883.

Application filed September 25, 1882. (No model.)

*To all whom it may concern:*

Be it known that I, GEORGE R. DUVAL, of Benicia, county of Solano, State of California, have invented an Improved Brake for Vehicles; and I hereby declare the following to be a full, clear, and exact description thereof.

My invention relates to certain improvements in brake-blocks for use upon vehicles; and it consists in certain details of construction, as hereinafter fully described, and specifically pointed out in the claim.

Referring to the accompanying drawings, Figure 1 is a view of the brake-block. Fig. 2 shows it removed from the bar. Fig. 3 is a horizontal section. Fig. 4 is a view of one of the bolts.

A is the brake-bar of a vehicle. This bar is properly supported, usually in front of the wheels to be locked, and has connected with it the levers or mechanism by which it is moved to or from the wheels and the brakes applied or removed. The brake-blocks B are fixed to the ends of the bar, so as to stand in front of the wheels, and they are properly shod, so that they will not wear out too rapidly when pressed against the wheels. My invention relates to the securing of these blocks to the bar. Each block B has two plates, C, fitted upon opposite sides and bent at right angles, so that the part C′ lies upon the back of the block. These plates do not meet upon the back, and they are secured to the block by a bolt, D, which passes through holes made through the side portions and through the block parallel with its face, so that when the nut E is screwed down close the plates clamp the block firmly between them, while, by reason of the bolt passing through a hole in the block, the latter is prevented from falling out, even if the clamps become loosened by its contraction or otherwise. As the plates are independent, any shrinkage of the block which would make it become loose is easily taken up by a turn of the nut E. In order to secure the block to the bar A bolts F pass from it through holes in the bar and nuts G upon the back side secure them in place. These bolts have heads, as shown at H, and the wood of the block B is cut away beneath the part C′ of the plates, so that the head of this bolt may lie beneath the plate. A ridge, J, of wood, is thus formed in the block between these heads H, against which they fit, and this limits the side movement of the block, and also assists to steady it. A slot, I, is made through each of the plates C′, through which the shank of the bolt F passes, and this slot allows the bolts to move sidewise to enter the holes in the brake-bar, and also allows the brake-block to be adjusted from side to side, so that it will stand exactly in line with the wheel-rim, whatever change may have taken place on account of side wear. After they have been secured in place it will be seen that any shrinkage of the brake-block which would loosen it in the plates C may be taken up by tightening the nut E, which draws the plates C C toward each other, the slots I allowing this to be done without disturbing the bolts F. The plates C′ have flanges *a* turned up at one side, and these rest upon the brake-bar when the block is in place. These flanges relieve the strain upon the block caused by the friction between it and the wheel when the brake is forced against the wheel, and which would tend to drag it off the bar or bend or break its holding-bolts.

Having thus described my invention, what I claim as new, and desire to secure by Letters Patent, is—

In combination with the brake-bar A and brake-block B, the independent slotted plates C C′, having the flanges *a* resting upon the top of the bar, as shown, each plate having a slot, I, to receive a bolt, F, so that the block may be adjusted in either direction, and the bolt D, passing through the block from side to side, substantially as herein described.

In witness whereof I have hereunto set my hand.

GEORGE R. DUVAL.

Witnesses:
S. H. NOURSE,
G. W. EMERSON.